United States Patent
Thiele et al.

(10) Patent No.: US 11,536,882 B2
(45) Date of Patent: Dec. 27, 2022

(54) METHOD OF FABRICATING AN IMAGING SYSTEM AND CORRESPONDING IMAGING SYSTEM

(71) Applicant: Baden-Württemberg Stiftung GGMBH, Stuttgart (DE)

(72) Inventors: Simon Thiele, Stuttgart (DE); Harald Giessen, Marnheim (DE); Christof Pruss, Ostfildern (DE); Alois Herkommer, Aalen (DE)

(73) Assignee: BADEN-WÜRTTEMBERG STIFTUNG GGMBH, Stuttgart (DE)

( * ) Notice: Subject to any disclaimer, the term of this patent is extended or adjusted under 35 U.S.C. 154(b) by 441 days.

(21) Appl. No.: 16/632,241

(22) PCT Filed: Jul. 18, 2017

(86) PCT No.: PCT/EP2017/000869
§ 371 (c)(1),
(2) Date: Jan. 17, 2020

(87) PCT Pub. No.: WO2019/015735
PCT Pub. Date: Jan. 24, 2019

(65) Prior Publication Data
US 2020/0166679 A1    May 28, 2020

(51) Int. Cl.
*G02B 5/18*        (2006.01)
*B33Y 10/00*       (2015.01)
(Continued)

(52) U.S. Cl.
CPC ........... *G02B 5/188* (2013.01); *G02B 5/1857* (2013.01); *B33Y 10/00* (2014.12); *B33Y 80/00* (2014.12); *G02B 27/4205* (2013.01)

(58) Field of Classification Search
CPC .. G02B 5/188; G02B 5/1857; G02B 27/4205; G02B 5/18; G02B 2005/1804;
(Continued)

(56) References Cited

U.S. PATENT DOCUMENTS

| | | |
|---|---|---|
| 7,969,654 B1 | 6/2011 | Ersoy et al. |
| 10,288,775 B1 * | 5/2019 | Keith ............... H01L 33/58 |

(Continued)

FOREIGN PATENT DOCUMENTS

| | | | | |
|---|---|---|---|---|
| CN | 215415975 U | * | 1/2022 | |
| EP | 3537216 A1 | * | 9/2019 | ....... B29D 11/00365 |

(Continued)

OTHER PUBLICATIONS

Yamada Kazuhiro et al: "Multilevel phase-type diffractive lenses in silica glass induced by filamentation of femtosecond laser pulses", Optics Letters, Optical Society of America, vol. 29, No. 16, Aug. 15, 2004 (Aug. 15, 2004), pp. 1846-1848.

(Continued)

*Primary Examiner* — Arnel C Lavarias
(74) *Attorney, Agent, or Firm* — Shook, Hardy & Bacon, LLP (57) ABSTRACT

A method of fabricating an imaging system as well as to a corresponding imaging system. The method includes providing a substrate; and forming, by means of a 3D-printing technique, a 3D structure on the substrate, wherein the forming of the 3D structure includes forming a stack of at least two diffractive optical elements in a single printing step.

18 Claims, 6 Drawing Sheets

(51) Int. Cl.
*B33Y 80/00* (2015.01)
*G02B 27/42* (2006.01)

(58) Field of Classification Search
CPC .. G02B 5/1814; G02B 5/1842; G02B 5/1847;
G02B 5/1866; G02B 5/1876; G02B
27/0025; G02B 27/0037; G02B 27/0043;
G02B 27/005; G02B 27/0056; G02B
27/42; G02B 27/4211; G02B 27/4216;
G02B 27/4272; G02B 27/4277; G02B
27/44; B33Y 10/00; B33Y 80/00; B33Y
30/00; B33Y 70/00
USPC ....... 359/566, 558, 565, 569, 571, 574, 575,
359/576; 427/162, 164
See application file for complete search history.

(56) References Cited

U.S. PATENT DOCUMENTS

| | | | |
|---|---|---|---|
| 11,095,813 B2 * | 8/2021 | Thiele | H04N 5/2254 |
| 2015/0380829 A1 | 12/2015 | Lee-Bouhours et al. | |
| 2018/0149796 A1 * | 5/2018 | Xu | G02B 6/0076 |

FOREIGN PATENT DOCUMENTS

| | | |
|---|---|---|
| WO | 2017077038 A1 | 5/2017 |
| WO | 2017100033 A1 | 6/2017 |

OTHER PUBLICATIONS

Timo Gissibl et al: "Two-photon direct laser writing of ultracompact multi-lens objectives", Nature Photonics, vol. 10, No. 8, Jun. 27, 2016 (Jun. 27, 2016), pp. 554-560.
Wataru Watanabe et al: "Fabrication of Fresnel zone plate embedded in silica glass by femtosecond laser pulses", Optics Express, vol. 10, No. 19, Sep. 23, 2002 (Sep. 23, 2002), p. 978.
Thiele S et al: "Design, simulation and 3D printing of complex micro-optics for imaging", 2016 International Conference On Optical Mems and Nanophotonics (OMN), IEEE, Jul. 31, 2016 (Jul. 31, 2016), pp. 1-2.
Masayuki Kato et al.: "Wavelength Independent Grating Lens System", Applied Optics, Optical Society of America, Washington, DC; US, vol. 28, No. 4, Feb. 15, 1989 (Feb. 15, 1989), pp. 682-686.
International Search Report and Written Opinion dated Apr. 19, 2018 in International Patent Application No. PCT/EP2017/000869, 17 pages.

* cited by examiner

METHOD OF FABRICATING AN IMAGING SYSTEM AND CORRESPONDING IMAGING SYSTEM

CROSS-REFERENCE TO RELATED APPLICATIONS

This application is a 35 U.S.C. § 371 national stage application of PCT Application Number PCT/EP2017/000869, filed Jul. 18, 2017, and titled "Method of Fabricating an Imaging System and Corresponding Imaging System," which is incorporated herein by reference in the entirety.

The present invention relates to a method of fabricating an imaging system as well as to a corresponding imaging system.

For many applications it is desirable to record a maximum of optical image information with an imaging system that is as small as possible. A measure for the information content is the number of distinguishably transmitted pixels or the associated so-called space-bandwidth-product, i.e. the product of image diameter and numerical aperture. Since for miniaturized systems the image circle is small by nature, the numerical aperture has to be designed as large as possible. With respect to classical refractive lens systems, this leads to significant problems, since the optical refractive power that are necessary to achieve large numerical apertures in the range of 0.5 to 0.9 can hardly or only with high effort be realized.

Conventionally, high space-bandwidth-products can be achieved for miniaturized imaging systems by three different approaches:

First, complex optics or complex optical elements can be assembled from individually fabricated lenses. This method is usually employed for fabricating conventional endoscopes or cameras for smartphones.

Second, a wafer based approach may be used in that individual wafers are initially provided with optical surfaces such as lenses and apertures by means of processes used in semiconductor fabrication and then stacked together.

Third, multi-lens refractive systems having continuously refractive interfaces have been fabricated by means of an additive fabrication process, i.e., by means of a stereolithography method on the micro- or nanoscale.

However, each of the conventional approaches have drawbacks:

In view of the first approach, i.e. assembled optics, reasonable achievable dimensions are about >300 µm for the diameter and >500 µm for the height. The numerical apertures are therefore not much more than 0.3. Thus, these systems are not only much larger than provided in the present invention but also the numerical apertures are significantly smaller.

In view of the second approach, i.e. wafer-level optics, individual wafers must have a certain minimal thickness in order to be processable. Usually, the wafers must have a thickness which is larger than 50 µm. This leads to the drawback that systems with a high refractive power, i.e. strongly curved lenses with small distances to each other, are only possible to a certain degree. Also, arbitrary free formed lenses can hardly be realized with conventional wafer processes.

And finally, in view of the third approach, i.e. additive fabricating of multi-lens refractive systems having continuously refractive interfaces, a high refractive power on smallest dimensions can hardly be realized. Furthermore, these systems are complex and the fabrication process by stereolithographic means takes quite a long time.

Therefore, it is a problem of the present invention to overcome the above mentioned drawbacks. In particular, it is a problem of the present invention to provide an improved method for fabricating a high-precision and miniaturized imaging system as well as to provide a corresponding high-precision and miniaturized imaging system. More specifically, it is a problem of the present invention to provide an imaging system and its fabrication method, which achieves, evaluated on the size of the imaging system and compared to conventional imaging systems of the same size, higher transmission of optical image information. This object is solved by the subject-matter of the independent claims. Preferred embodiments are subject to the dependent claims.

According to one aspect of the present invention, a method of fabricating an imaging system is provided. The method comprises the steps of:

providing a substrate; and forming, by means of a 3D-printing technique, a 3D-structure on the substrate, wherein the forming of the 3D-structure comprises forming a stack of at least two diffractive optical elements in a single printing step.

Within the present description, the plane being perpendicular to a longitudinal and/or optical axis of the imaging system is referred to as the x-y-plane. The z-direction being perpendicular to the x-y-plane is parallel to the longitudinal and/or optical axis of the imaging system. It is noted that the diffractive optical elements are arranged such that a longitudinal and/or optical axis of the diffractive optical elements or the stack of diffractive optical elements is identical to the longitudinal and/or optical axis of the imaging system.

In particular, the imaging system is a microscale imaging system. The term "microscale" in the sense of the present description shall particularly mean that the imaging system has sizes of below 1 mm, preferably below 500 µm, more preferably below 300 µm and most preferably below 200 µm. More specifically, a lateral dimension of the imaging system, i.e. a dimension in the x-y-plane and particularly a diameter of the imaging system, may be below 500 µm, preferably below 300 µm and most preferably below 200 µm. A dimension in the z-direction, i.e. a height of the imaging system may be below 500 µm, preferably below 300 µm and most preferably below 100 µm.

The substrate may be any material which is suitable to be used as a base material for a three dimensional (3D)-printing technique, i.e. for printing 3D-structures by means of an additive process. The substrate may preferably be a thin plate or disk. For example, the substrate may be a BK7 slide with a thin layer of indium tin oxide. The thickness of the substrate may be in the range of 100 µm to 2000 µm. In particular, the substrate may be a functional object such as a sensor or an optical fiber.

Within the present invention, the terms "forming" and "writing" particularly mean or encompass a "three dimensional (3D)-printing". Accordingly, the step of "forming, by means of a 3D-printing technique, a 3D-structure on the substrate" may also be formulated as "3D-printing of a 3D-structure on the substrate".

The 3D-structure is formed, particularly directly, on the substrate by means of a 3D-printing technique, i.e. an additive fabrication process. In particular, the 3D-structure is formed directly on a surface of the substrate. In other words, the formation of the 3D-structure is performed directly on the substrate by means of a 3D-printer. In still other words, the formation of the 3D-structure comprises a direct 3D-printing of the 3D-structure on the substrate. As a 3D-printing technique, femtosecond direct laser writing, particularly a femtosecond 2-photon lithography may be used. Preferably, a three-dimensional dip-in multiphoton laser lithography is used.

In particular, the substrate is covered by a photoresist which is then exposed by an exposing beam in order to form the 3D-structures. By exposing the photoresist, distinct parts of the photoresist may be cured. After exposing and partly curing the photoresist, the unexposed photoresist may be removed, which finally results in a 3D-structure.

The forming or printing of the 3D-structure comprises forming or printing of at least two, e.g. two, three, four etc., diffractive optical elements. A "diffractive optical element (DOE)", also referred to as "diffractive lens", in the sense of the present invention is a planar and flat optical element, particularly in the form of a thin disk or plate, having a diffractive surface, e.g. a grating or a surface with distinct recesses and edges, for forming a light beam based on diffraction. A DOE may be a diffractive surface-relief lense. More specifically, a DOE has a diffractive surface with a predefined phase function. In particular, a DOE may be a phase plate. Preferably, a DOE is axial symmetric and/or has the form of a flat disk.

Accordingly, a DOE in the sense of the present invention differs from a refractive optical element, such as a lens or a multi-lens objective, in that a refractive optical element, contrary to a DOE, deflects light by means of refraction. Furthermore, contrary to a DOE being a thin disk or plate with a diffractive surface, a refractive optical element or lens is a curved, and therefore more expanded, object. In other words, the volume of a refractive optical element is larger than the volume of a DOE. As the light bending effect is limited to a plane, a DOE does not have the optical aberration of Petzval field curvature anymore. Ultimately, a DOE enables a better overall optical performance.

As already mentioned above with respect to the third conventional approach for fabricating an imaging system, imaging systems which are fabricated by an additive manufactoring process or by means of a 3D-printing technique conventionally consist of complex and expanded lens systems having continuously refractive interfaces and a large volume compared to a stack of DOEs as fabricated according to the present invention. In this respect, it is noted by the inventors that the additive fabrication of a stack of DOEs has not been considered and realized before the present invention. Rather, experts in the field of additive fabrication or 3D-printing, believed that, generally, a stable stack of thin disks cannot be fabricated with available 3D-printing techniques. However, within the present invention, it has been surprisingly found out that, despite the expected difficulties, the fabrication of a stack of DOEs by means of a 3D-printing technique in a single step is possible.

Preferably, the forming of the 3D-structure is performed such that the at least two diffractive optical elements are stacked on each other and separated by a predefined distance, wherein the distance is preferably in a range between 10 µm and 100 µm. Further preferably, the forming of the 3D-structure is performed such that the at least two diffractive optical elements are aligned, particularly with respect to centering and/or distance, with an alignment error, particularly in the lateral direction, of less than 500 nm, more preferably less than 300 nm and most preferably less than 100 nm.

In particular, the present method comprises a segmentation of phase functions and its formation on thin, a few wavelengths thick, plates, which are printed spatially separated on top of each other. The segmentation enables an increased diffraction efficiency and results in more compact and more efficient systems. For example, flat lenses or DOEs do not have a Petzval curvature, which is known from usual lenses.

Forming the 3D-structure in one single 3D-printing step advantageously avoids the need for further alignment and ensures a high degree of reliability of the fabrication process and thus a high quality. In particular, the lateral alignment error, which is usually critical for structures such as DOEs, is due to the fabrication in a single printing step in the range of a few 10 nm and is therefore uncritical for the optical function. Less critical for the optical function is the vertical alignment error which can be up to 2 µm. If needed, the vertical alignment error can be reduced by compensation methods.

Furthermore, the 3D-printed imaging system according to the present invention allows highly efficient sub-µm resolution imaging at visible wavelengths over a bandwidth of 40 nm, combined with a field-of-view of up to 70°. In particular, high image contrasts and resolutions below 500 nm can be achieved. As additional benefit, the stacked flat lenses dramatically reduce the writing times of 3D-printed lens systems with superior imaging quality.

The present invention shows how miniaturized imaging systems having a spatial-bandwidth-product that has not been reached before, can be realized. In particular, according to the present invention, this can be achieved by means of a combination or a stack of 3D-printed DOEs, i.e. a combination or a stack of 3D-printed flat diffractive lenses. Furthermore, compared to the formation systems having continuously refractive interfaces, the fabrication time can significantly be reduced by a factor of 10 to 100. Also, absorption losses and usual problems of polymer optics (e.g. stress birefringence, fluorescence, inner scattering) can be reduced, since light passes less material.

The fact that the thin 3D-printed DOEs maintain their desired shape and position is contrary to the intuition of experts and thus a surprising finding according to the present invention. It is assumed by the inventors that the 3D-printed DOEs are under residual stress due to shrink processes which avoid a sagging or other deformations of the 3D-printed DOEs.

In a preferred embodiment, each diffractive optical element has a thickness-to-diameter ratio which is at least 1:200 and not more than 1:5. According to the present invention, it has been found out that DOEs having such a thickness-to-diameter ratio offer good optical properties and can be 3D-printed with the necessary stability and robustness. Each DOE may have a thickness in the range of only a view wavelengths.

In particular, each DOE may have a thickness between 1 µm to 20 µm, preferably between 3 µm to 15 µm, more preferably between 5 µm to 10 µm, and in particular about 8 µm. The diameter of each DOE may preferably be between 100 µm and 300 µm, more preferably between 150 µm and 250 µm.

In a further preferred embodiment, the forming of the 3D-structure further comprises forming a supporting structure which is configured to support the at least two diffractive optical elements. In particular, the supporting structure is a shell or a housing. The supporting structure particularly fixes and/or connects the at least two diffractive optical elements.

In a further preferred embodiment, the forming of the 3D-structure further comprises forming at least one discharge opening or aperture in the 3D-structure, particularly in the supporting structure and/or shell, between the diffractive optical elements so that an unexposed photoresist, which is used for the 3D-printing, is able to discharge or can be removed during or after the 3D-printing, particularly when developing the exposed photoresist. In particular, a discharge opening is formed between each two subsequent diffractive optical elements. In this manner, it can be avoided that any unexposed photoresist deteriorates the functionality of the DOEs. Accordingly, the quality of the DOEs can be improved.

In a further preferred embodiment, the volume ratio of the discharge openings with respect to a sidewall of the 3D-structure, particularly with respect to the supporting structure or shell of the 3D-structure, is between 0, 2 and 5. Such a volume ratio advantageously results in an effective discharge of the unexposed photoresist while the necessary stability or robustness of the 3D-structure can be achieved.

In a further preferred embodiment, the 3D-printing step, particularly the forming of the diffractive optical elements, comprises exposing a photoresist being deposited on the substrate, wherein the exposing is performed on a voxel by voxel basis by guiding an exposing beam on concentric circles or concentric circle tracks, wherein a starting point of the exposing beam on each concentric circle track is preferably determined randomly. A "track" in the sense of the present invention may also be referred to as "trace". Each of the concentric circle tracks has a different diameter, wherein the exposing preferably starts with exposing the circle having the largest diameter and ends with exposing the circle having the smallest diameter. For each circle to be exposed, the starting point over the respective circle track may be determined. randomly. In other words, the writing or printing process is performed by exposing the photoresist in concentric circles from the periphery of a DOE to the center of the DOE. Each concentric circle relates to a corresponding writing track. In other words, the writing or exposing laser leaves written tracks in the form of concentric circles in the photoresist. Depending on the exposing dose the photoresist changes its refractive index. By writing the 3D-structure, particularly the DOEs, in concentric circles, a homogeneous exposure of voluminous regions is possible. Furthermore, it can be ensured that each new, i.e. each subsequent circle or writing track to be exposed is in connection or in contact with a region or structure of the photoresist, that has already been cured. Thereby, a surprising stability and robustness of the 3D-structure and particularly of the DOEs can be achieved.

In a further preferred embodiment, the 3D-printing step comprises exposing a photoresist being deposited on the substrate, wherein the exposing is performed such that writing tracks of subsequent writing layers to be exposed are laterally shifted in an alternating manner by a predefined distance. Preferably, the tracks are shifted by half of the lateral track distance. A typical track distance may be, e.g., about 75 nm. Thereby, a high filling factor can advantageously be achieved. The term "filling factor" in the sense of the present invention relates to the coverage of the volume with writing tracks, i.e. the ratio of the volume containing writing tracks to the total volume of the structure to be written. A high coverage with only a few gaps, i.e. a high filling factor, leads to a higher and more homogenous polymerization. A writing track in the sense of the present description is a distinct track or trace in the x-y-plane, which, according to a predefined design or CAD model of the 3D-structure, has to be exposed. A writing layer is a lateral layer of the 3D-structure, i.e. a layer in the x-y plane, which, according to a predefined design or CAD model of the 3D-structure, has to be exposed by means of the 3D printer. Preferably, two subsequent writing layers have a distance (in the z-direction) in a range of about 100 nm to 200 nm, in particular of about 150 nm.

In a further preferred embodiment, the diffractive optical elements have edge structures, wherein the edge structures are formed by using an exposing dose of the 3D printer, which differs from a standard exposing dose that is used for bulk structures, i.e., structures other than edges. This results in a higher lateral and vertical resolution. For example, the exposing dose for writing the edge structures may be reduced by about 20% compared to the exposing dose used for bulk structures. The edge structures result in distinct diffraction effects. Thus, it is important that these edge structures are not washed out. It has been found out within the present invention that by using different exposing doses, the edge structures and thus the optical properties of the DOEs and the imaging system can significantly be improved.

In a further preferred embodiment, the diffractive optical elements have edge structures, wherein the edge structures are formed in that an additional edge optimizing track is written on an upper boundary of desired edge structures, particularly of each desired edge structure. The upper boundary of an edge structure is the peak or the highest point or region of the edge structure with respect to the z-direction. A desired edge structure is an edge structure that is intended to be formed or written. In other words, a desired edge structure is an ideal edge structure (without any defects) according to a predefined design or model. The additional edge optimizing track is an additional writing track which is used to improve or optimize the edge structure of the DOEs. In particular, writing an additional edge optimizing track means that an optimizing structure on an upper boundary of a desired edge structure is additionally written, i.e. a portion of the photoresist corresponding to the optimizing track or structure is additionally exposed. The optimizing track or structure would not have been written or exposed according to the predefined design or model. However, within the present invention, it has been found out that writing an additional track, particularly an additional concentric circle or concentric circle track, on an upper boundary of an edge structure can reduce or avoid deteriorations that occur due to the 3D-printing process. Accordingly, the edge optimizing track is a means for avoiding that the edges are deteriorated or washed-out due the 3D printing process.

Additionally or alternatively, a target track is omitted on a lower boundary of desired edge structures, particularly of each desired edge structure. The lower boundary of an edge structure is the lowest point or region, i.e. a trench, of the edge structure with respect to the z-direction. A target track in the sense of the present description is a writing track that, according to an ideal design or model of the 3D-structure, is intended or desired to be written. However, within the present invention, it has been found out that omitting a target track on a lower boundary of an edge structure can reduce or avoid deteriorations that occur when forming the 3D-structure by means of a 3D-printing technique, particularly due to the exposing and developing process.

Thus, by writing an optimizing track and/or by omitting an intended or target track, in the following referred to as "edge or boundary optimization technique", the quality of 3D-printed edge structures can be improved. In particular, the diffraction efficiency of the DOEs and thus of the whole imaging system can advantageously be increased.

In a further preferred embodiment, the diffractive optical elements have edge structures with undercuts. In other words, the diffractive optical elements have edge structures or edges with an inclined flank, i.e. an edge with a flank that is tilted with respect to the z-direction and/or which is not perpendicular to the x-y-plane. Such undercuts in connection with axially symmetric structures cannot be formed with conventional methods such as dry etching of a sample. However, within the present invention, it has been found out that undercuts are possible with 3D-printing techniques, particularly when using the inventive edge or boundary optimization technique as described above.

The step of forming the 3D-structure may further comprise forming anti-reflection coatings, either by coatings or by nanostructuring. In particular, anti-reflection coatings on the DOEs may be formed by 3D-printing. Preferably, such antireflection coatings are formed in a single 3D-printing step, i.e. together with the formation of the 3D-structure.

According to a further aspect of the present invention, an imaging system is provided. The imaging system comprises:
a substrate; and
a 3D-structure on the substrate, wherein
the 3D-structure comprises a stack of at least two diffractive optical elements that have been printed by means of a 3D-printing technique in a single printing step.

In particular, the 3D-structure is a 3D-printed structure.

In a preferred embodiment of the imaging system, each diffractive optical element has a thickness-to-diameter ratio which is at least 1:200 and not more than 1:5.

In a further preferred embodiment of the imaging system, the 3D-structure further comprises a supporting structure which is configured to support the at least two diffractive optical elements.

In a further preferred embodiment of the imaging system, the 3D-structure, particularly the supporting structure, comprises at least one discharge opening between the diffractive optical elements so that an unexposed photoresist is able to discharge after the 3D-printing.

In a further preferred embodiment of the imaging system, the volume ratio of the discharge openings with respect to a sidewall of the 3D-structure, particularly with respect to the supporting structure, is between 0, 2 and 5.

In a further preferred embodiment of the imaging system, the 3D-structure is formed by exposing a photoresist being deposited on the substrate, wherein the exposing is performed on a voxel by voxel basis by guiding an exposing beam on concentric circle tracks, wherein a starting point of the exposing beam on each concentric circle track is preferably determined randomly.

In a further preferred embodiment of the imaging system, the 3D-structure is formed by exposing a photoresist being deposited on the substrate, wherein the exposing is performed such that writing tracks of subsequent writing layers of the photoresist are laterally shifted in an alternating manner by a predefined distance.

In a further preferred embodiment of the imaging system, the diffractive optical elements have edge structures that are formed by using an exposing dose of the 3D printer, which differs from a standard exposing dose that is used for structures other than edges.

In a further preferred embodiment of the imaging system, the diffractive optical elements have edge structures which are formed in that
an additional edge optimizing track is written on an upper boundary of desired edge structures, and/or
a target track is omitted on a lower boundary of desired edge structures.

In a further preferred embodiment of the imaging system, the diffractive optical elements have edge structures with undercuts.

For the above mentioned further independent aspect and in particular for preferred embodiments in this regard, the explanations given above or below concerning the embodiments of the first aspect also hold true. In particular, for one independent aspect of the present invention and for preferred embodiments in this regard, the explanations given above and below concerning the embodiments of the respective other aspects also hold true.

Individual embodiments for solving the problem are described by way of example below with reference to the figures. In this case, the individual embodiments described have in part features which are not absolutely necessary for implementing the claimed subject matter, but which provide desired properties in specific applications. In this regard embodiments which do not have all the features of the embodiments described below are also intended to be regarded as disclosed in a manner coming under the technical teaching described. Furthermore, in order to avoid unnecessary repetitions, specific features are mentioned only with regard to individual embodiments from among the embodiments described below. It is pointed out that the individual embodiments are therefore intended to be considered not only by themselves but also in a joint consideration. On the basis of this joint consideration the person skilled in the art will recognize that individual embodiments can also be modified by inclusion of individual or a plurality of features of other embodiments. It is pointed out that a systematic combination of the individual embodiments with individual or a plurality of features described with regard to other embodiments may be desirable and expedient and is therefore intended to be taken into account and also to be regarded as encompassed by the description.

BRIEF DESCRIPTION OF THE FIGURES

The above and other objects, features and advantages of the present invention will become more apparent upon reading of the following description of preferred embodiments and accompanying drawings. Other features and advantages of the subject-matter described herein will be apparent from the description and the drawings and from the claims. It should be understood that even though embodiments are separately described, single features and functionalities thereof may be combined without prejudice to additional embodiments. The present disclosure is illustrated by way of example and not limited by the accompanying figures.

Preferred embodiments of the present invention are exemplarily described regarding the following figures.

DETAILED DESCRIPTION OF THE FIGURES

The following detailed description relates to exemplary embodiments of the present invention. Other embodiments of the invention are possible within the scope of the invention as defined by the appended claims. Throughout the figures, same reference signs are used for the same or similar elements.

If flat lenses or DOEs are used for imaging, strong color and coma aberrations may lead to a significant decrease in image quality. For example, color dispersion is an inherant property of diffractive lenses. In order to correct dispersions and/or aberrations of a DOE, at least one additional DOE may be used to compensate the dispersions and/or aberrations. In other words, a combination or a cascade of at least two DOEs may compensate the dispersions and/or aberrations of the individual DOEs and thus increase the imaging quality. This is explained in more details below in connection with FIGS. 1 and 2.

A single surface can act as a perfect lens with focal length f for focusing on the optical axis if it adds a parabolic phase of $\varphi(r) = -2\pi/\lambda \sqrt{r^2+f^2}$ to an incident wave front. However, if light is impinging under a certain angle $\alpha$, the lens will not form a perfect focus unless an angle-dependent phase term $\varphi(\alpha)$ is added to the lens phase which at the same time deteriorates the performance for angles other than $\alpha$. Thus, a single flat phase element cannot provide aberration free imaging over an extended field of view. This problem can be solved if the phase surface is not flat but has a curved shape. However, fabrication of such surfaces is challenging. Another option is the combination of two or more flat lenses (i.e. DOEs), inspired by the combination of two or more lenses for monochromatic aberration corrections of $1^{st}$ (defocusing, distortion) and $3^{rd}$ (spherical aberration, astigmatism, coma, Petzval field curvature) order in multi-element lens systems. In this case, the additional degrees of freedom introduced by the distance between first and second element leads to a total phase shift which is a function of both, the pupil radius as well as the angle of incidence.

Figure 1:
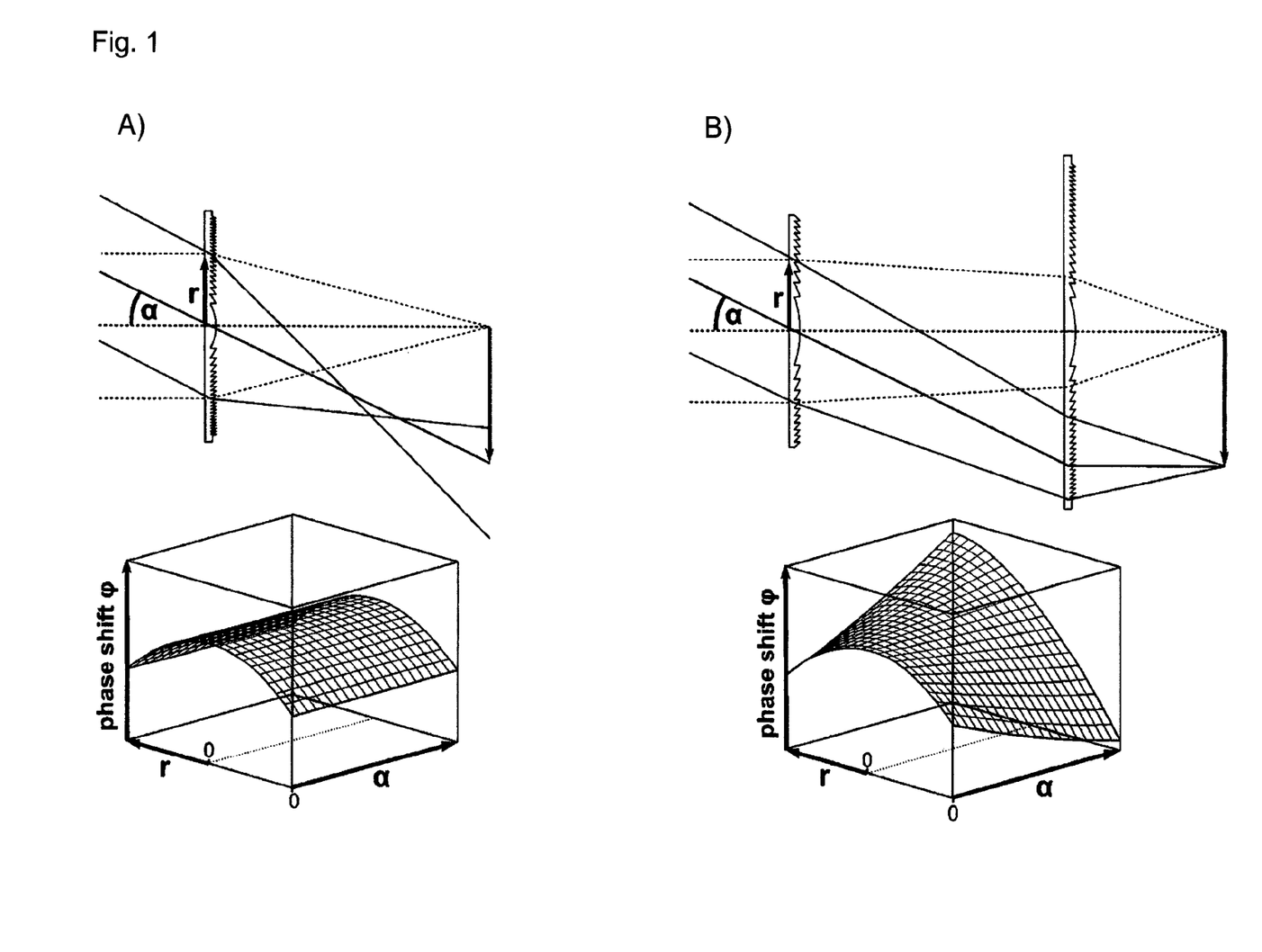
FIG. 1 shows schematics regarding a phase shift as a function of entrance pupil radius r and angle of incidence α for A) a single DOE and B) a combination of two DOEs.
Figure 2:
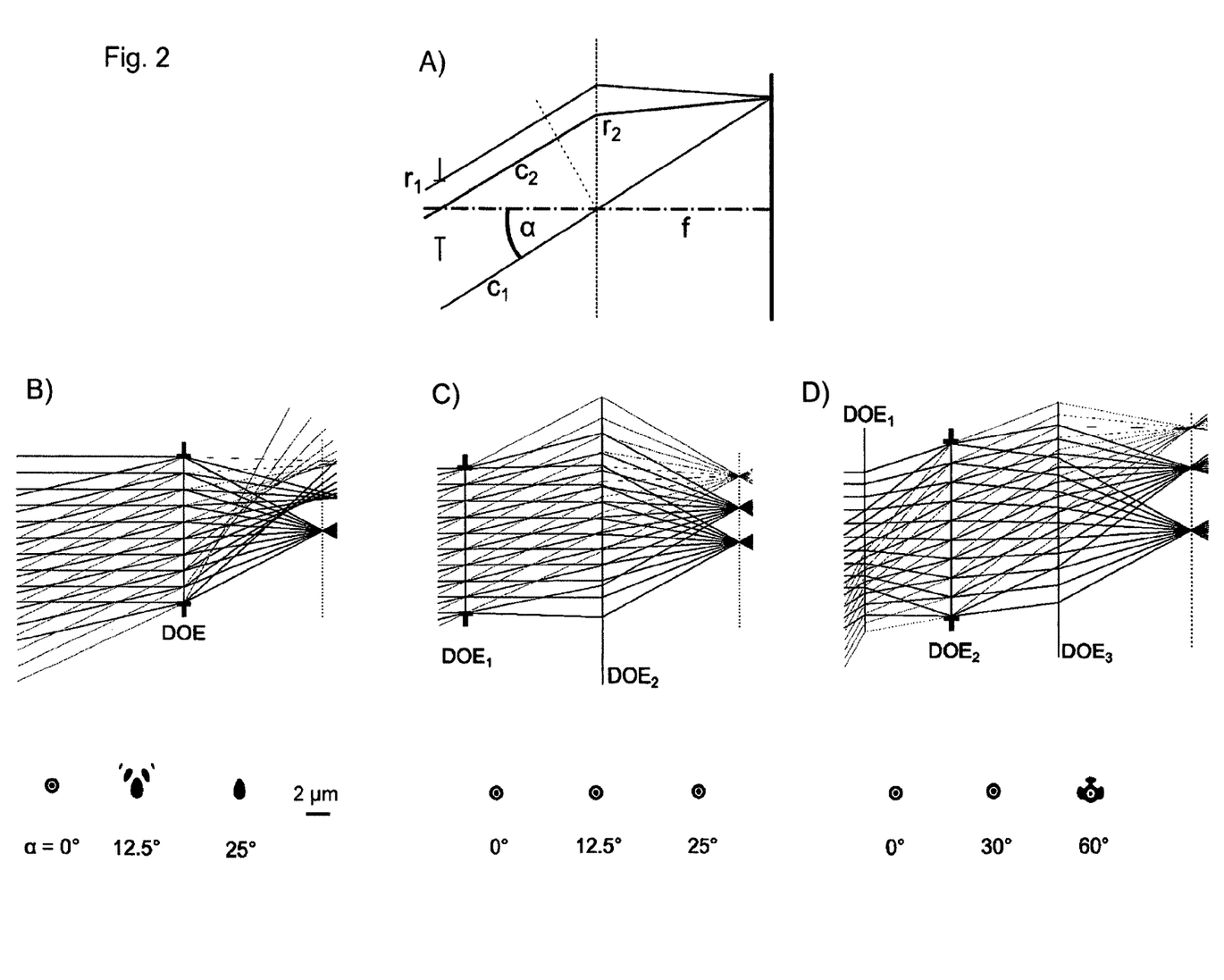
FIG. 2A shows a schematic with geometric relations used for theoretical considerations regarding a correction of monochromatic aberrations by combining DOEs.
FIG. 2B shows schematics regarding field dependent aberrations of a single perfect DOE whose phase function creates a converging spherical wave.
FIG. 2C shows schematics regarding field dependent aberrations for a combination of two DOEs, wherein both DOEs are optimized for a minimum point spread function over the whole field of view.
FIG. 2D shows schematics regarding field dependent aberrations for a combination of three DOEs with a full field of view of 120°.

FIG. 1 shows schematics regarding a phase shift as a function of entrance pupil radius r and angle of incidence $\alpha$ for A) a single DOE and B) a combination of two DOEs. According to FIG. 1A, one flat lens leads to a parabolic phase shift $\varphi(r)$ but does not allow for an angle dependent control of the phase $\varphi(r,\alpha)$. This leads to strong aberrations for fields with oblique incidence. According to FIG. 1B, if two or more lenses are combined, the phase shift $\varphi(r,\alpha)$ can be chosen as a function of both variables and thus can lead to an aberration free system over a wide field of view.

FIG. 2A shows a schematic with geometric relations used for the following theoretical considerations. FIG. 2B shows schematics regarding field dependent aberrations of a single perfect DOE whose phase function creates a converging spherical wave. FIG. 2C shows schematics regarding field dependent aberrations for a combination of two DOEs, wherein both DOEs have been optimized for a minimum point spread function over the whole field of view. And FIG. 2D shows schematics regarding field dependent aberrations for a combination of three DOEs with a full field of view of 120°.

The analysis on aberrations of flat lenses can be expressed in terms of optical path differences. In this formulation, the third-order off-axis wave aberrations of a perfect flat lens are given with respect to the ray $c_1$ (see FIG. 2A) in dependence of the angle of incidence $\alpha$, the focal length f, and the ray height $r_2$ by $$OPD(r_2) = \frac{\alpha}{2f^2} r_2^3 - \frac{3\alpha^2}{4f} r_2^2, \qquad [1]$$

wherein "OPD" stands for the optical path difference.

The first term which represents $3^{rd}$ order coma starts to become dominant for low f-numbers, the second term which denotes astigmatism and Petzval field curvature is more dominant in systems with high f-numbers and high angles-of-view. Within the present invention, designs with low f-numbers, i.e. high numerical aperture, resulting in a dominant coma term are preferred.

If an aperture is introduced before the lens element (radial coordinate: $r_1$), the wave aberration with respect to the chief ray $c_2$ can be expressed as $$OPD(r_2+r_1)-OPD(r_2)= \frac{\alpha}{2f^2}(r_1+r_2)^3 - \frac{3\alpha^2}{4f}(r_1+r_2)^3 - \frac{\alpha}{2f^2}r_2^3 + \frac{3\alpha^2}{4f}r_2^2. \quad [2]$$

Since the main goal is to correct the $3^{rd}$ order comatic aberration, additional terms with $r^3$ dependence have to be introduced. This can be achieved by additionally considering the spherical aberration term prevalent at the flat lens (radial coordinate: $r_2$), which is expressed as $$-s\frac{r_2^4}{8f^3}. \quad [3]$$

Here the factor s can later be chosen such that the third order coma disappears. After inserting this expression into Eq. 2, the total aberration changes to $$-s\frac{(r_1+r_2)^4}{8f^3} + \frac{\alpha}{2f^2}(r_1+r_2)^3 - \frac{3\alpha^2}{4f}(r_1+r_2)^2 + s\frac{r_2^4}{8f^3} - \frac{\alpha}{2f^2}r_2^3 + \frac{3\alpha^2}{4f}r_2^2. \quad [4]$$

Expansion of the products allows to isolate the following terms with cubic dependency of $r_1$ or $r_2$:

$$-4\alpha f r_1^3 + 4s(r_1^3 r_2 + r_1 r_2^3) \quad [5].$$

These terms vanish if $$s=\frac{\alpha f r_1^2}{r_1^2 r_2 + r_2^3}. \quad [6]$$

Within the present invention, the factor s was calculated for the example system displayed in FIG. 2a, where $\alpha=25°$, $f=100$ μm and $r_1=r_2=50$ μm. The resulting value of 0.44 was then multiplied with the $4^{th}$ order term of the phase function of the DOE, leading to an imaging system with strongly reduced aberrations. However, in such a system spherical aberration becomes dominant.

The spherical or residual aberrations can be corrected by adding an extra DOE at the position of the aperture (i.e. radial coordinate $r_1$). Balancing of these aberrations within raytracing software can finally lead to an aplanatic design with diffraction limited performance (see FIG. 2C).

By using more than two DOEs, a distribution of diffractive power allows for aberration corrected designs with very high fields of view of up to 120°. FIG. 2D shows a corresponding design example. A higher number of DOEs generally enables an improved correction of aberrations, particularly for large field angles and high numerical apertures.

FIG. 3A shows a single diffractive lens design having a numerical aperture of 0.8. On the left hand side a schematic representation of the optical design and on the right hand side a schematic representation of the corresponding CAD design is illustrated. The diffractive lens comprises a diffractive optical element 10 which has a diffractive relief or a diffractive surface 13 with a predefined phase function. The DOE 10 is a thin and/or flat disk having a thickness-to-diameter ratio which is at least 1:200 and not more than 1:5.

FIG. 3B shows a schematic representation of an optical design (left hand side) and a corresponding CAD design (right hand side) for an imaging system according to a first exemplary embodiment of the present invention. The imaging system according to the first embodiment comprises a 3D-structure 100 with a stack of two DOEs 10, wherein each DOE 10 has a diffractive surface 13.

FIG. 3C shows a schematic representation of an optical design (left hand side) and a corresponding CAD design (right hand side) for an imaging system according to a second exemplary embodiment of the present invention. The imaging system according to the second embodiment comprises a 3D-structure 100 with a stack of three DOEs 10, wherein each DOE 10 has a diffractive surface 13.

In both embodiments the DOEs 10 are stacked on each other along the optical axis (i.e. the z-axis) of the imaging system, wherein the optical axis is a longitudinal axis of each DOEs and/or the 3D-structure 100 and/or the imaging system.

As shown in FIGS. 3B and 3C, the 3D-structure 100 further comprises a supporting structure or a shell 20 for supporting and/or connecting the at least two DOEs 10. The supporting structure 20 comprises a plurality of pillars 25 that are arranged between two subsequent DOEs 10 and that hold and stabilize the DOEs 10 at the rim or the periphery of the DOEs 10. The supporting structure 20 separates the DOEs by a distinct distance.

The supporting structure 20 further comprises a plurality of discharge openings 30. Like the pillars 25, also the discharge openings 30 are arranged in the 3D-structure between two subsequent DOEs 10. By means of the discharge openings 30 an unexposed photoresist is able to discharge during or after the 3D-printing, particularly after exposing and during developing the exposed photoresist. The discharge openings 30 are lateral accesses for the developer.

The supporting structure or shell 20 has to be formed such that the discharge openings 30 are sufficiently large for an effective discharge of the unexposed photoresist and that the 3D-structure has a sufficient stability and robustness. Within the present invention, it turned out that the volume ratio of the discharge openings with respect to the shell 20 has to be between 0, 2 and 5 in order to fulfill the above criteria.

Figure 3:
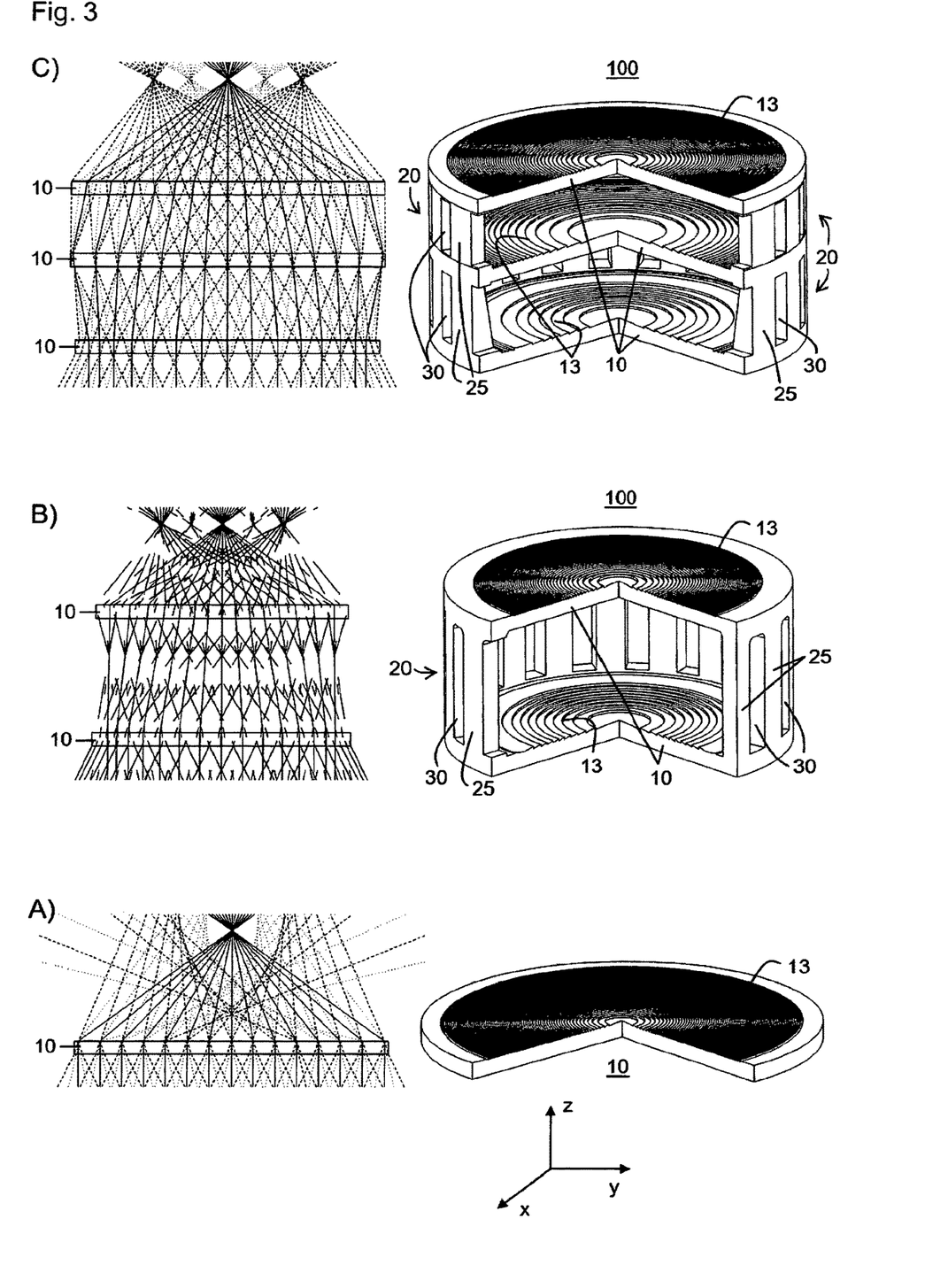
FIG. 3A shows a schematic representation of an optical design (left hand side) and a corresponding CAD design (right hand side) for a single diffractive lens with a numerical aperture of 0.8.
FIG. 3B shows a schematic representation of an optical design (left hand side) and a corresponding CAD design (right hand side) for an imaging system comprising a stack of two DOEs, according to an exemplary embodiment of the present invention.
FIG. 3C shows a schematic representation of an optical design (left hand side) and a corresponding CAD design (right hand side) for an imaging system comprising a stack of three DOEs, according to an exemplary embodiment of the present invention.

According to the present invention, a 3D-structure 100 such as shown in FIGS. 3B and 3C is formed, by means of a 3D-printing technique, on a substrate (not shown in FIG. 3). The forming of the 3D-structure 100 comprises forming a stack of at least two DOEs 10 in a single printing step. Thereby, aplanatic imaging systems, namely singlets, doublets, and triplets of DOEs are provided. They can be fabricated without the need for further alignment by femtosecond direct laser writing in one single step and from one material with sizes of below 200 μm in diameter and 100 μm in height. The resulting lenses allow highly efficient sub-pm resolution imaging at visible wavelengths over a bandwidth of 40 nm, combined with a field-of-view of up to 70°. As additional benefit, these stacked flat lenses dramatically reduce the writing times of 3D printed lens systems with superior imaging quality.

Figure 4:
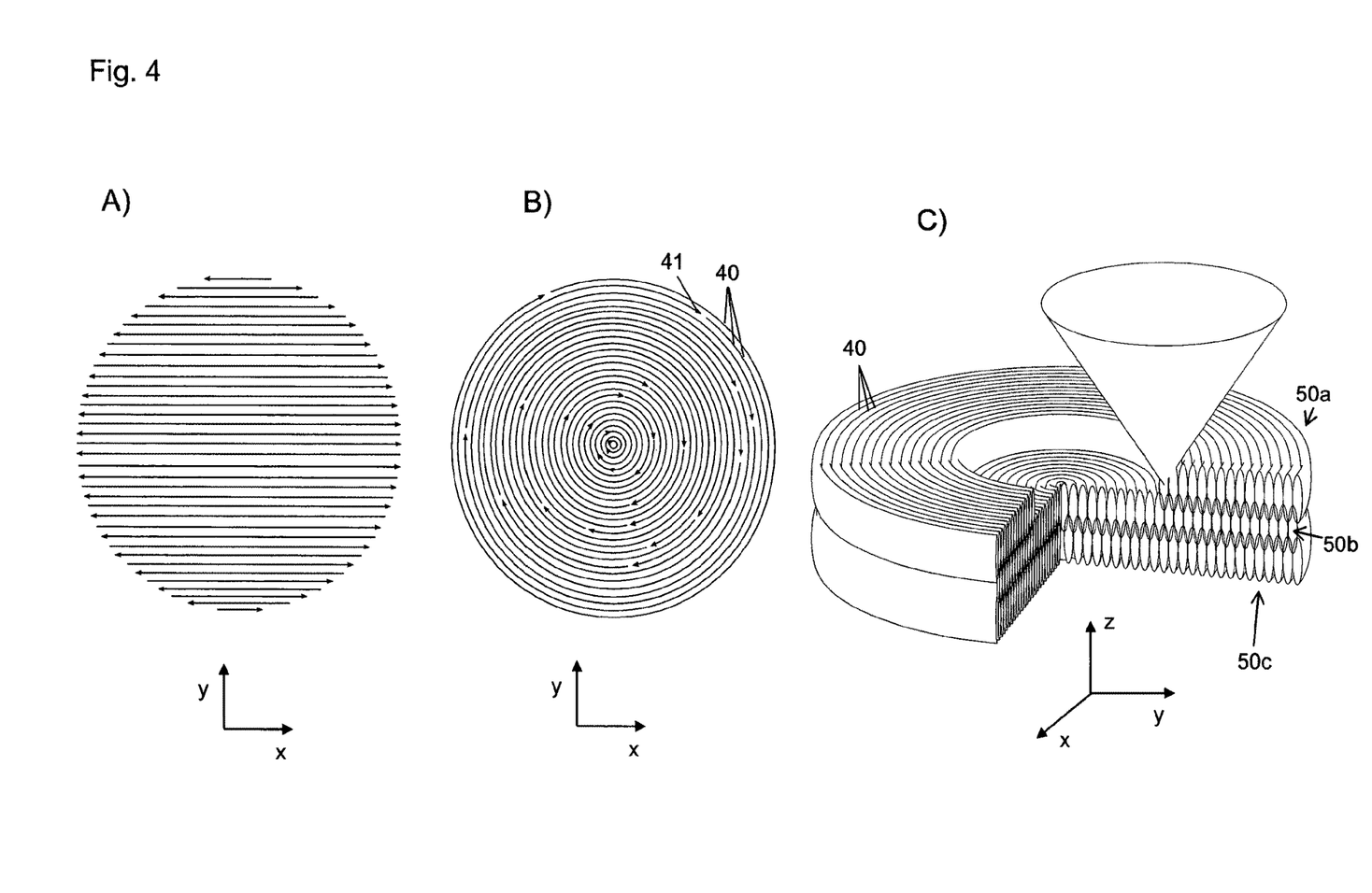
FIG. 4A shows a schematic representation in a plan view of a conventional Cartesian writing process.
FIG. 4B shows a schematic representation in a plan view of a polar writing process as used according to a preferred embodiment of the present invention.
FIG. 4C shows a schematic representation in a cross sectional view of a 3D writing process according to a preferred embodiment of the present invention.

FIG. 4A shows a schematic representation in a plan view of a Cartesian writing process, which is conventionally used for printing 3D-structures with a 3D-printing technique. By means of the Cartesian writing process, tracks are written line by line. However, within the present invention, it turned out that for printing high quality DOEs, a homogeneous exposure of voluminous regions is important. To this extent, a printing process in concentric circles has been found to be advantageous. Such a polar writing process is illustrated in FIG. 4B. In case of the polar writing process, the exposure is performed on a voxel by voxel basis by guiding an exposing beam on concentric circle tracks 40, wherein a starting point 41 of each circle track 40 (marked with an arrow in FIG. 4B) is distributed randomly on each circle track 40.

Especially for writing voluminous objects, it has been found out by the inventors that it is advantageous that the writing tracks 40 of subsequent writing layers 50a-50c are laterally shifted to each other, as it is illustrated in FIG. 4C. According to FIG. 4C, the writing tracks 40 of writing layer 50b are laterally shifted with respect to the writing tracks 40 of writing layers 50a and 50c, respectively. In particular, the writing tracks 40 of writing layer 50b are arranged between the writing tracks 40 of writing layer 50a in a lateral direction, i.e. with respect to the x-y-plane. Also, the writing tracks 40 of writing layer 50b are arranged between the writing tracks 40 of writing layer 50c in a lateral direction, i.e. with respect to the x-y-plane. In other words, the exposing is performed such that writing tracks 40 of subsequent writing layers 50a-50c of the photoresist are laterally shifted in an alternating manner, i.e., in the example of FIG. 4C, a writing track 40 of layer 50b is shifted to the left with respect to a corresponding writing track 40 of layer 50a and a corresponding writing track 40 of layer 50c is shifted to the right with respect to the corresponding writing track 40 of layer 50b. Accordingly, the writing tracks 40 of writing layer 50a and the writing tracks 40 of writing layer 50c are not shifted to each other in the lateral direction, i.e. in the x-y-plane.

For the diffractive structures, it is important that high line densities and at the same time a high aspect ratio is realized. The resolution of the 2-photon-lithography is in the range of about 200 nm. This is helpful for the formation of high frequency diffractive structures. Within the present invention, an additional optimization in the 3D-printing of edge structure of the DOEs has been developed in order to increase the diffraction efficiency. This boundary optimization technique is described in the following in connection with FIG. 5A to 5E.

It is intended that the printed profile of the diffractive structure is as much as possible equal to the desired target profile according to a predefined design. For the 3D-print, this profile is fragmented in a plurality of individual writing layers 50a-50c (see FIG. 4C). Subsequent writing layers (e.g. layers 50a and 50b) preferably have a distance to each other of about 150 nm. The rounding of structures due to the exposing process and the subsequent washing-out lead for this layer distance to a sufficiently flat surface. However, at the edges of the individual zones, a rounding is not desired, since this would degrade the diffraction efficiency. A possible rounding is counteracted by a corresponding overcompensation. That is, at the highest point of the zone, an additional track with adjusted writing or exposing dose is written, which strongly washes-out, but which protects the subjacent profile. Correspondingly, a writing track is omitted in the trench of the zone, i.e. at its deepest point, which leads to the opposite effect.

Figure 5:
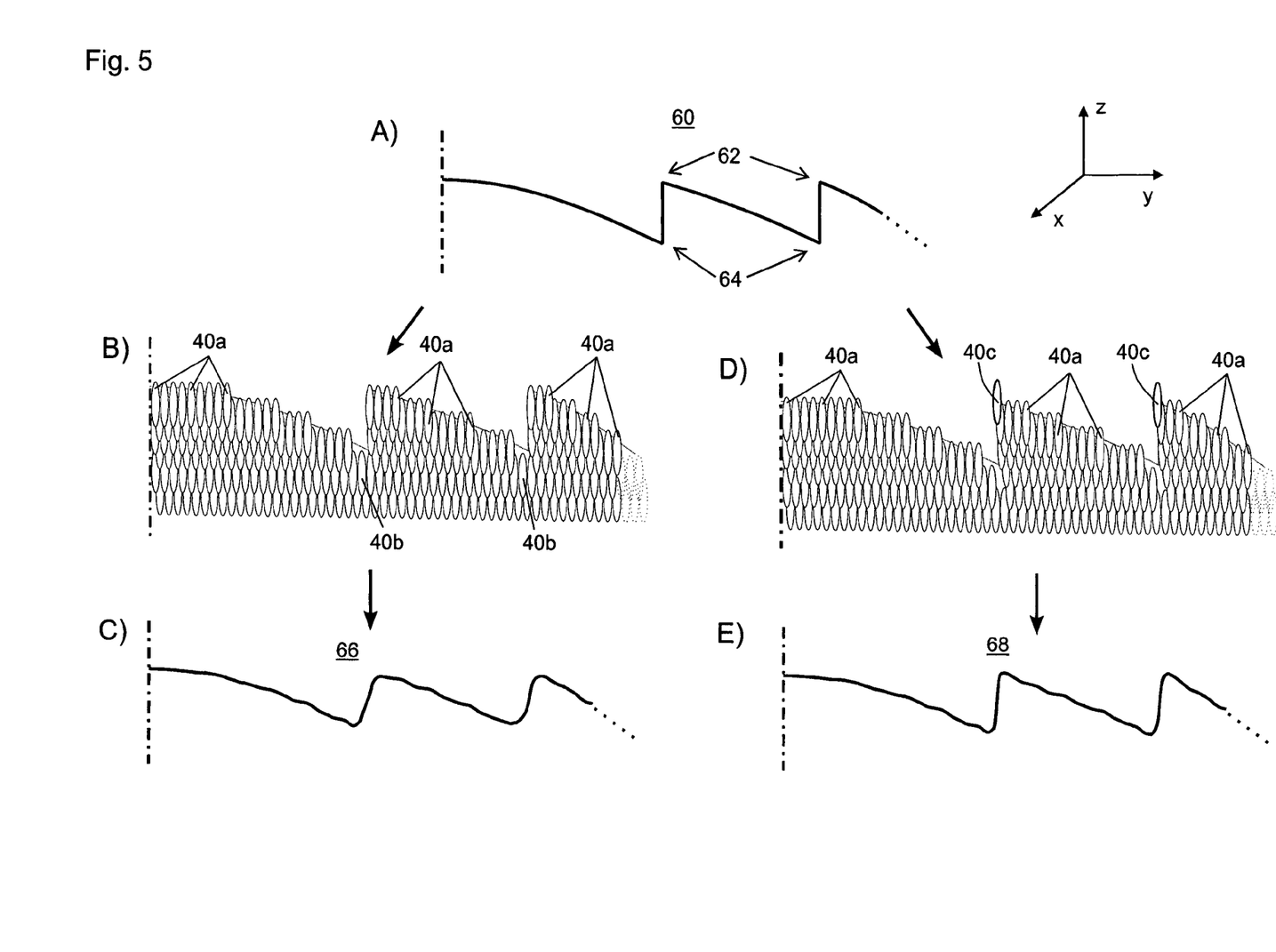
FIG. 5A shows a schematic representation in a cross sectional view of ideal edge structures of a DOE.
FIG. 5B shows a schematic representation in a cross sectional view of target writing tracks for forming edge structures of a DOE.
FIG. 5C shows a schematic representation in a cross sectional view of resulting edge structures formed by means of a 3D printing technique when writing the target writing tracks as shown in FIG. 3B.
FIG. 5D shows a schematic representation in a cross sectional view of optimized writing tracks for forming edge structures of a DOE, according to a preferred embodiment of the present invention.
FIG. 5E shows a schematic representation in a cross sectional view of resulting edge structures formed by means of a 3D printing technique when writing the optimized writing tracks as shown in FIG. 3D.

FIG. 5A shows a schematic representation in a cross sectional view of ideal, i.e. desired edge structures 60 of a DOE 10, the edge structure having an upper boundary or peak 62 and a lower boundary or trench 64. FIG. 5B shows a schematic representation in a cross sectional view of a plurality of writing tracks 40a, 40b for forming edge structures 60 of a DOE. The writing tracks 40a and 40b are target writing tracks, i.e. writing tracks 40 that, according to a predefined design, are intended to or should be written. FIG. 5C illustrates the resulting edge structures 66 which are formed by means of a 3D printing technique when writing the target writing tracks 40a, 40b, as shown in FIG. 3B. FIG. 5D shows an optimization of the writing tracks 40 for forming the edge structures 60 of a DOE. As can be seen in FIG. 5D, an additional edge optimizing track 40c is written on the upper boundary 62 of the desired edge structure 60, while target tracks 40b (see FIG. 5B) are omitted on a lower boundary 64 of the desired edge structure 60. Thus, the writing tracks 40a, 40c as shown in FIG. 5D are actually or really written tracks. Target tracks 40a, as exemplarily indicated in FIGS. 5B and 5D, are tracks that are present both in FIG. 5B and FIG. 5D. Thus, all target tracks 40a are actually written. Target tracks 40b, however, are only present in FIG. 5B and not in FIG. 5D, i.e., target tracks 40b are not actually written but omitted. Such a boundary optimization technique leads to improved 3D-printed edge structures 68 (FIG. 5E) compared to edge structures 66 that are written without the boundary optimization technique (FIG. 5C). In particular, the edges of FIG. 5E are more pronounced and sharper than the edges of FIG. 5C. This results in an improved diffraction efficiency and thus in an improved imaging quality of the DOEs and the imaging system.

An important aspect for optimizing the efficiency of diffractive lenses is the minimization of scattering losses on the edges. This can be achieved by an inclination of the edge flanks, i.e. by providing the edge structures with an undercut, as illustrated in FIGS. 6A to 6D.

Figure 6:
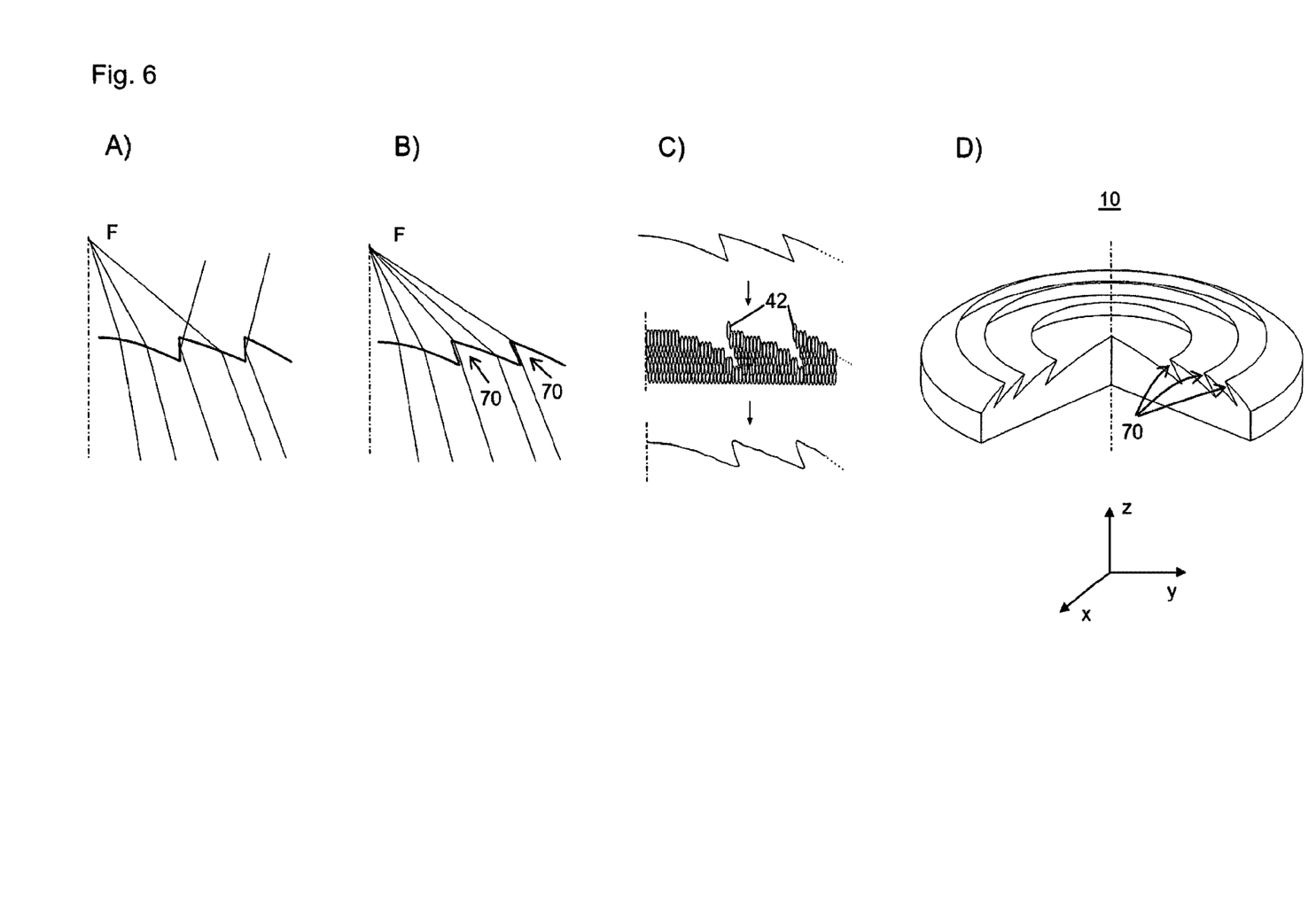
FIG. 6A shows a schematic representation in a cross sectional view of the scattering behavior of a DOE having edge structures without undercuts.
FIG. 6B shows a schematic representation in a cross sectional view of the scattering behavior of a DOE having edge structures with undercuts.
FIG. 6C shows a schematic representation in a cross sectional view of a writing process from the target profile (top sketch) over an optimized arrangement of writing tracks (middle sketch) to the result after developing the exposed structures.
FIG. 6D shows a schematic representation in a cross sectional view of a DOE having edge structures with undercuts.

FIG. 6A shows a schematic representation in a cross sectional view of the scattering behavior of a DOE having edge structures without undercuts, while FIG. 6B shows a schematic representation in a cross sectional view of the scattering behavior of a DOE having edge structures with undercuts. In case of oblique incident light (in FIGS. 6A and 6B from the bottom to the top), perpendicular flanks (FIG. 6A) result in an internal total reflection and thus to an energy loss in the focal point F, since due to the total reflection a portion of the light is scattered away. If the flanks of the edges are inclined in the direction of arrival, i.e. by means of edges having undercuts (FIG. 6B), these energy losses can significantly be reduced or even avoided. FIG. 6C shows a schematic representation in a cross sectional view of a writing process from the target profile (top sketch) over an optimized arrangement of writing tracks (middle sketch) to the result after developing the exposed structures. As already described above in connection with FIG. 5D, additional edge optimizing tracks 40c are written on an upper boundary of the desired edge structure, while a target track 40b (see FIG. 5B) is omitted on a lower boundary of the desired edge structure. FIG. 6D shows a schematic representation in a cross sectional view of a DOE 10 having edge structures with undercuts 70, i.e. with inclined flanks. Depending on the angle of incidence, the improvements due to the formation of undercuts can be significant. With respect to axially symmetric structures such as DOEs, the formation of undercuts cannot be realized with conventional 2.5D processing techniques such as dry etching. However, by means of a 3D-printing technique, undercuts also for axially symmetric structures can reproducibly be formed.

In the lateral direction, i.e. in the x-y-plane, the writing spot is shifted by means of a Galvo-mirror. In the z-direction, the sample itself may be shifted by means of a Piezo-unit. Thus, the 3D printing process is free from adjustment in the lateral direction. Possible deviations from the target design only depend on random fluctuations of the beam and/or object positioning mechanisms. In the z-direction, a Piezo-unit can be used, which has a precision in the low two-digit nanometer range. The smallest structure periods (radial width of a zone) are in the range of about 700 nm. In order to reduce the writing time, the supporting structure, which does not have an optical function, can be written with a larger layer- and track distance than the optically relevant regions.

Within the present invention, designs with a high numerical aperture of up to 0.8 have been developed. This ensures that the ratio of height to diameter of the lens stacks remains small, thus reducing the amount of straylight which easily propagates through the all-transparent device from unwanted directions. The phase reliefs may be designed and optimized for a wavelength of 543 nm with the raytracing software ZEMAX using a global optimization algorithm. The optimum phase $\varphi$ as a function of radius r can be determined in terms of coefficients $\alpha_i$ as $\varphi(r)=\Sigma_{i=1}^{N}\alpha_i r^{2i}$ by using raytracing based on a local grating approximation (LGA). The necessary relief to create this phase in air can be calculated by modulating the function in steps of $2\pi$ and multiplying the result with $$\frac{\lambda}{2\pi(n-1)},$$

where n is the refractive index of the photoresist at the used wavelength $\lambda$. For example, a photoresist with n=1.548 may be used.

A minimum DOE feature size of ~0.7 μm may result in case of the singlet lens. The final geometry of the lens stacks are optimized to reduce the amount of printed resist volume and at the same time to minimize the writing time in that the diffractive surfaces are placed on thin disks which are mounted on pillars. All lenses may be restricted to a maximum diameter of 200 μm.

Within the present invention, the designs have been 3D-printed in dip-in configuration with a Nanoscribe 'Photonic Professional GT' device using IP-DIP photoresist which was specifically developed for highest resolutions. As substrates, 170 μm thick BK7 slides with a thin layer of indium tin oxide were used. Typical writing times of imaging systems such as the one displayed in FIG. 3B was in the range of 15 minutes but can be further reduced.

In summary, the combination of multiple diffractive lenses, fabricated in one single step by femtosecond 3D printing, allows highly compact imaging systems for visible wavelengths. According to theory, one diffractive lens element allows perfect imaging only for one point, two surfaces permit a correction of the main first-order aberrations, and three surfaces help to further improve the performance at high numerical apertures or high angle-of-views. In contrast to concepts using metasurfaces, the phase relief lenses are basically insensitive to polarization and transmit light over a broad spectral range with high efficiencies.

With sizes of below 200 μm in diameter and 100 μm in height, the 3D-printed lenses resolve line spacings of 550 nm at a wavelength of 550 nm and over a FWHM bandwidth of 40 nm. With three planar lenses, a resolution of below 800 nm over a wide field of view of 70° can be achieved, lower than the pixel pitch of today's image sensors. As expected, the performance deteriorates clearly when broadband illumination is used. However, some of these color effects can be significantly reduced by digital means.

The fabrication method of femtosecond 3D printing is inherently alignment free and highly precise at the same time. One of its main drawbacks, hour-long fabrication times, is diminished because the lenses only require a small amount of material. This is due to the fact that diffraction happens only at the phase relief layers which are less than 1 μm in thickness. Currently, the writing time is about 15 minutes for a doublet lens but can be further reduced if the mounting disks are made thinner and the support structures are written with a coarser line spacing.

The present invention opens the possibility for high resolution imaging on smallest scales which is particularly interesting for applications in endoscopy, drone vision, or security, as well as for smartphones, imaging sensors, and augmented/virtual reality displays. Moreover, if used in reverse, the lenses could act as small scale microscope objective lenses with diffraction-limited imaging quality.

LIST OF REFERENCE NUMERALS 10 diffractive optical element (DOE)/flat diffractive lens
13 diffractive surface
20 supporting structure/shell/housing
25 pillar
30 discharge opening/aperture
40 writing track/concentric circle track
40a target writing track (actually written)
40b target writing track (omitted, i.e., not actually written)
40c edge optimizing track
41 starting point
50a writing layer
50b writing layer
50c writing layer
60 desired (target) edge/desired (target) edge structure
62 upper boundary/peak
64 lower boundary/trench
66 3D-printed edge structure without boundary optimization technique
68 3D-printed edge structure with boundary optimization technique
70 undercut/inclined flank
100 3D-structure
F focal point

The invention claimed is:

1. A method of fabricating an imaging system, the method comprising:
providing a substrate; and
forming, using a 3D printing technique, a 3D structure on the substrate, wherein the forming of the 3D structure comprises forming a stack of at least two diffractive optical elements in a single printing step.

2. The method of claim 1, wherein each of the at least two diffractive optical elements has a thickness-to-diameter ratio which is at least 1:200 and not more than 1:5.

3. The method of claim 1, further comprising forming a supporting structure for supporting the at least two diffractive optical elements.

4. The method of claim 3, further comprising forming at least one discharge opening in the supporting structure between the at least two diffractive optical elements so that an unexposed photoresist is able to discharge during or after the 3D printing.

5. The method of claim 4, wherein a volume ratio of the at least one discharge opening with respect to the supporting structure is between 0.2 and 5.

6. The method of claim 1, further comprising exposing a photoresist deposited on the substrate, wherein the exposing of the photoresist is performed on a voxel by a voxel basis by guiding an exposing beam on concentric circle tracks, wherein a starting point of the exposing beam on each of the concentric circle tracks is determined randomly.

7. The method of claim 1, further comprising exposing a photoresist deposited on the substrate, wherein the exposing of the photoresist is performed such that writing tracks of subsequent writing layers to be exposed are laterally shifted in an alternating manner by a predefined distance.

8. The method of claim 1, wherein the at least two diffractive optical elements have edge structures, wherein the edge structures are formed by using an exposing dose of a 3D printer that differs from a standard exposing dose that is used for structures other than edges.

9. The method of claim 1, wherein the at least two diffractive optical elements have edge structures, and wherein the edge structures are formed such that at least one of the following is present: (a) an additional edge optimizing track is written on an upper boundary of desired edge structures; and (b) a target track is omitted on a lower boundary of the desired edge structures.

10. The method of claim 1, wherein the at least two diffractive optical elements have edge structures with undercuts.

11. An imaging system, comprising:
a substrate; and
a 3D structure positioned on the substrate, wherein the 3D structure comprises a stack of at least two diffractive optical elements that have been printed using a 3D printing technique in a single printing step, and wherein each of the at least two diffractive optical elements has a thickness-to-diameter ratio that is at least 1:200 and not more than 1:5.

12. The imaging system of claim 11, wherein the 3D structure is formed by exposing a photoresist deposited on the substrate, wherein the exposing of the photoresist is performed on a voxel by a voxel basis by guiding an exposing beam on concentric circle tracks, wherein a starting point of the exposing beam on each concentric circle track is determined randomly.

13. The imaging system of claim 11, wherein the 3D structure is formed by exposing a photoresist deposited on the substrate, wherein the exposing of the photoresist is performed such that writing tracks of subsequent writing layers of the photoresist are laterally shifted in an alternating manner by a predefined distance.

14. The imaging system of claim 11, wherein the at least two diffractive optical elements have edge structures that are formed by using an exposing dose of a 3D printer that differs from a standard exposing dose that is used for structures other than edges.

15. The imaging system of claim 11, wherein the at least two diffractive optical elements have edge structures that are formed such that at least one of the following is present: (a) an additional edge optimizing track is written on an upper boundary of desired edge structures; and (b) a target track is omitted on a lower boundary of the desired edge structures.

16. The imaging system of claim 11, wherein the diffractive optical elements have edge structures with undercuts.

17. An imaging system, comprising:
a substrate; and
a 3D structure positioned on the substrate, wherein the 3D structure comprises a stack of at least two diffractive optical elements that have been printed using a 3D printing technique in a single printing step; and
a supporting structure configured to support the at least two diffractive optical elements, wherein the supporting structure comprises at least one discharge opening located between the at least two diffractive optical elements so that an unexposed photoresist is able to discharge during or after the 3D printing technique.

18. The imaging system of claim 17, wherein a volume ratio of the at least one discharge opening with respect to the supporting structure is between 0.2 and 5.

* * * * *